(12) United States Patent
Sarraf et al.

(10) Patent No.: US 10,833,458 B2
(45) Date of Patent: Nov. 10, 2020

(54) TEMPERATURE SENSOR ASSEMBLY FOR AN ELECTRICAL CONNECTOR

(71) Applicant: TE CONNECTIVITY CORPORATION, Berwyn, PA (US)

(72) Inventors: David Bruce Sarraf, Elizabethtown, PA (US); Nathan Philip Myer, Lancaster, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 16/541,413

(22) Filed: Aug. 15, 2019

(65) Prior Publication Data

US 2020/0067237 A1 Feb. 27, 2020

Related U.S. Application Data

(60) Provisional application No. 62/720,501, filed on Aug. 21, 2018.

(51) Int. Cl.
*H01R 13/66* (2006.01)
*G01K 7/42* (2006.01)
*H01R 13/713* (2006.01)

(52) U.S. Cl.
CPC .......... *H01R 13/6683* (2013.01); *G01K 7/42* (2013.01); *H01R 13/7137* (2013.01); *Y10S 439/913* (2013.01)

(58) Field of Classification Search
CPC ............ H01R 13/7137; H01R 13/6683; Y10S 439/913
See application file for complete search history.

(56) References Cited

U.S. PATENT DOCUMENTS

| 7,540,772 | B2 | 6/2009 | Sardi et al. |
| 9,362,690 | B2* | 6/2016 | Huang .................. H01R 24/30 |
| 2013/0122740 | A1 | 5/2013 | Siebens |
| 2018/0034197 | A1 | 2/2018 | Lyon et al. |
| 2018/0048090 | A1* | 2/2018 | Kawai ................ H01R 13/5812 |
| 2018/0097316 | A1* | 4/2018 | Rose ........................ B60L 3/04 |
| 2018/0219316 | A1* | 8/2018 | Suzuki ................ H01R 13/426 |

OTHER PUBLICATIONS

"Connector Device, Connector Assembly and Manufacturing Method for the Vehicle Electrical Power Supply", ip.com Journal, ip.com Inc., West Henrietta, NY, US. Aug. 12, 2011.
International Search Report, International Application No. PCTIB2019/057005, International Filing Date, Aug. 20, 2019.

* cited by examiner

*Primary Examiner* — Tho D Ta

(57) ABSTRACT

An electrical connector including a housing having a terminal channel with a power terminal in the terminal channel. The electrical connector includes a temperature sensor assembly positioned in the chamber. The temperature sensor assembly includes a sealing pad holding the power terminal and a thermal shunt held by the sealing pad. A temperature sensor is coupled to the thermal shunt. The sealing pad is electrically insulative and has a terminal opening receiving the power terminal. The sealing pad is thermally coupled to the power terminal and thermally coupled to the thermal shunt. The thermal shunt has a thermal conductivity higher than a thermal conductivity of the sealing pad. The temperature sensor monitors the temperature of the power terminal through a thermal path defined by the sealing pad and the thermal shunt.

21 Claims, 8 Drawing Sheets

TEMPERATURE SENSOR ASSEMBLY FOR AN ELECTRICAL CONNECTOR

CROSS REFERENCE TO RELATED APPLICATIONS

This application claims benefit to U.S. Provisional Application No. 62/720,501, filed Aug. 21, 2018, titled "REDUCED SENSOR TIME CONSTANT FOR HEMS CONNECTORS", the subject matter of which is herein incorporated by reference in its entirety.

BACKGROUND OF THE INVENTION

The subject matter herein relates generally to temperature sensor assemblies for electrical connectors.

Electrical connectors, such as power connectors, generate heat when current flows through the terminals and cables of the power connectors. For example, an electrical connector of a charging inlet assembly for a battery system of an electric vehicle (EV) or hybrid electric vehicle (HEV) may generate heat through the terminals and the cables of the charging inlet assembly during a charging process. A charging connector is configured to be mated with the terminals of the charging inlet assembly to charge the battery system of the vehicle. It is desirable to increase the current transmitted through the terminals for charging the battery. However, at higher currents, the terminals and the power cables experience an increase in temperature, which may damage the components of the charging inlet assembly.

Some known charging inlet assemblies utilize a temperature sensor in thermal communication with the terminal to control the charging. The temperature sensor needs to be electrically isolated from the terminal. Known charging inlet assemblies utilize a silicone rubber pad that serves both as a weather seal and as a means of conducting heat from the terminal to the temperature sensor. The silicone rubber pad conducts heat from the terminal surface to the temperature sensor. However, the silicone rubber pad provides thermal resistance in the heat flow path. The thermal resistance creates a significant offset error between the time the terminal achieves a particular temperature and the time when the temperature sensor measures such temperature. The silicone rubber pads thermal resistance and thermal capacitance represent a long thermal time constant that introduces a significant time lag between a change in pin temperature and a change in temperature measured by the temperature sensor.

A need remains for a cost effective and reliable temperature sensor assembly for an electrical connector providing accurate temperature sensing and fast response time to temperature changes.

BRIEF DESCRIPTION OF THE INVENTION

In one embodiment, an electrical connector is provided. The electrical connector includes a housing extending between a front and a rear. The housing has a chamber at the rear and a terminal channel between the front and the rear. The electrical connector includes a power terminal coupled to the housing. The power terminal includes a mating pin at a front of the power terminal and a cable connector at a rear of the power terminal. The mating pin is positioned in the terminal channel for mating with a charging connector. The cable connector is positioned in the chamber at the rear of the housing. The electrical connector includes a temperature sensor assembly positioned in the chamber. The temperature sensor assembly includes a sealing pad holding the power terminal. The temperature sensor assembly includes a thermal shunt held by the sealing pad. The temperature sensor assembly includes a temperature sensor coupled to the thermal shunt. The sealing pad has a terminal opening receiving the power terminal. The sealing pad is electrically insulative. The sealing pad is thermally coupled to the power terminal and thermally coupled to the thermal shunt. The sealing pad has a first thermal conductivity. The thermal shunt has a second thermal conductivity higher than the first thermal conductivity. The temperature sensor monitors the temperature of the power terminal through a thermal path defined by the sealing pad and the thermal shunt.

In another embodiment, a temperature sensor assembly for monitoring a temperature of a power terminal is provided. The temperature sensor assembly includes a sealing pad having a front and a rear. The sealing pad has a terminal opening therethrough receiving the power terminal such that a mating pin of the power terminal extends forward of the sealing pad for mating with a charging connector and a cable connector of the power terminal extends rearward of the sealing pad for terminal to a power cable. The sealing pad is an elastomer being electrically insulative and thermally conductive having a first thermal conductivity. The sealing pad is thermally coupled to the power terminal. The temperature sensor assembly includes a thermal shunt separate and discrete from the sealing pad. The thermal shunt is held by the sealing pad and extends rearward from the rear of the sealing pad to a distal end. The thermal shunt is thermally coupled to the sealing pad. The thermal shunt has a second thermal conductivity higher than the first thermal conductivity. The temperature sensor assembly includes a temperature sensor coupled to the distal end of the thermal shunt. The temperature sensor is configured to monitor the temperature of the power terminal through a thermal path defined by the sealing pad and the thermal shunt.

In a further embodiment, a charging inlet assembly is provided. The charging inlet assembly includes a housing extending between a front and a rear. The housing has a mounting flange for mounting the housing to a vehicle. The housing has a charging port configured to receive a charging connector. The housing includes a chamber at the rear. The charging inlet assembly includes an electrical connector within the charging port of the housing. The electrical connector includes terminal channels open at the front to receive the charging connector. The electrical connector includes power terminals received in the terminal channels. Each power terminal includes a mating pin at a front of the power terminal and a cable connector at a rear of the power terminal. The mating pin is positioned in the corresponding terminal channel for mating with the charging connector. The cable connector extends into the chamber for electrical connection to a power cable. The charging inlet assembly includes a temperature sensor assembly positioned in the chamber. The temperature sensor assembly includes a sealing pad holding the power terminals. The temperature sensor assembly includes a thermal shunt held by the sealing pad. The temperature sensor assembly includes a temperature sensor coupled to the thermal shunt. The sealing pad has terminal openings receiving the power terminals. The sealing pad is electrically insulative to electrically isolate the power terminals. The sealing pad is thermally coupled to the power terminals and thermally coupled to the thermal shunt. The sealing pad has a first thermal conductivity. The thermal shunt has a second thermal conductivity higher than the first thermal conductivity. The temperature sensor monitors the temperature of the power terminals through the sealing pad and the thermal shunt.

DETAILED DESCRIPTION OF THE INVENTION

Figure 1:
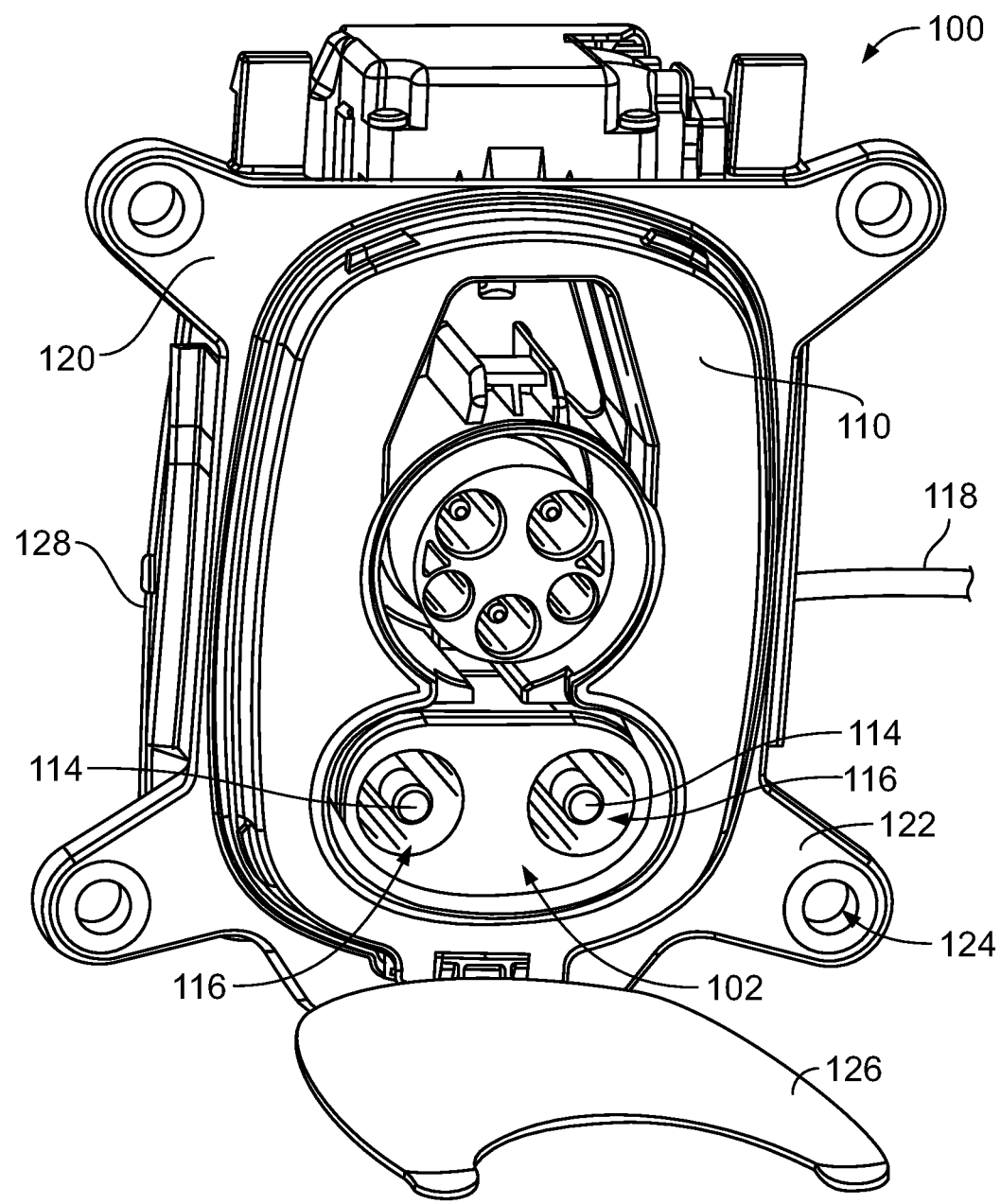
FIG. 1 is a front perspective view of a charging inlet assembly including an electrical connector in accordance with an exemplary embodiment.

FIG. 1 is a front perspective view of a charging inlet assembly 100 including an electrical connector 102 in accordance with an exemplary embodiment. While the electrical connector 102 may be described herein as part of the charging inlet assembly, it is realized that the electrical connector 102 may be another type of electrical connector. The charging inlet assembly 100 is used as a charging inlet for a vehicle, such as an electric vehicle (EV) or hybrid electric vehicle (HEV). The electrical connector 102 of the charging inlet assembly 100 is configured for mating reception with a charging connector (not shown). In an exemplary embodiment, the electrical connector 102 is configured for mating with a DC fast charging connector, such as the SAE combo CCS charging connector, in addition to AC charging connectors, such as the SAE J1772 charging connector.

The electrical connector 102 of the charging inlet assembly 100 includes a housing 110 holding power terminals 114 forming part of the electrical connector 102. The power terminals 114 are electrically connected to corresponding power cables 118. The power terminals 114 are configured to be mated to the charging connector. The power terminals 114 are received in terminal channels 116 of the housing 110 and coupled to the housing 110 in the terminal channels 116.

In an exemplary embodiment, the charging inlet assembly 100 includes a temperature sensor assembly 130 (further shown in FIG. 3) for monitoring the temperature of the power terminals 114 during charging. The charging rate of the charging connector is controlled based on the temperature of the power terminals 114. For example, if the temperature reaches a threshold temperature, the charging rate may be slowed or charging may cease to prevent damage to the power terminals 114. The temperature sensor assembly 130 has a fast response time to quickly control the charging process to prevent damage to the power terminals 114. The temperature sensor assembly 130 is located on the back side of the charging inlet assembly 100, such as within the interior of the charging inlet assembly 100.

The charging inlet assembly 100 includes a mounting flange 120 coupled to the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

The charging inlet assembly 100 includes a terminal cover 126 hingedly coupled to the mounting flange 120 and/or the housing 110. The cover 126 is used to cover corresponding power terminals 114. The charging inlet assembly 100 may include a rear cover 128 coupled to a rear of the housing 110 that closes access to the rear of the housing 110. The power cables 118 may pass through the rear cover 128 and/or sides of the housing 110.

Figure 2:
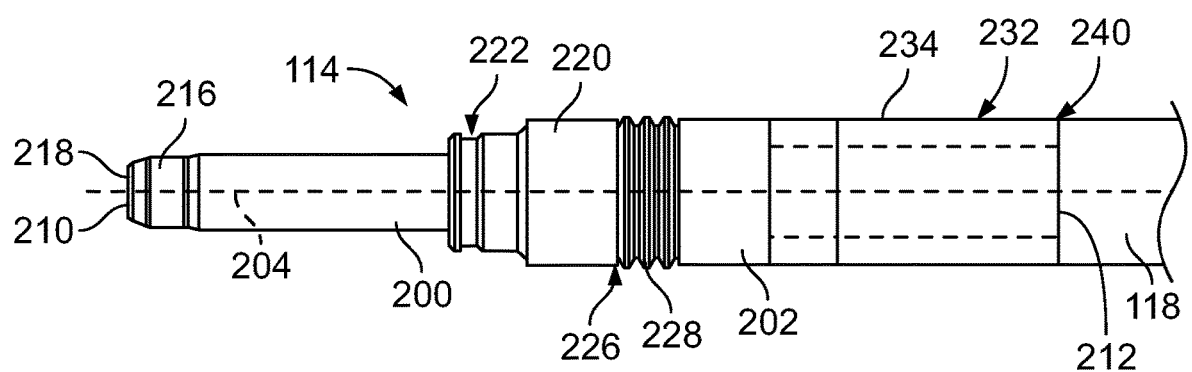
FIG. 2 is a side view of a power terminal for the charging inlet assembly in accordance with an exemplary embodiment.

FIG. 2 is a side view of the power terminal 114 in accordance with an exemplary embodiment. The power terminal 114 includes a mating pin 200 at a front 210 of the power terminal 114 and a cable connector 202 at a rear 212 of the power terminal 114. The power terminal 114 extends along a longitudinal axis 204. The mating pin 200 is configured to be mated to the charging connector. The cable connector 202 is configured to be electrically connected to the power cable 118.

In various embodiments, the cable connector 202 is separate and discrete from the mating pin 200 and configured to be mechanically and electrically coupled to the mating pin 200. For example, the cable connector 202 may be press fit onto the mating pin 200. However, the cable connector 202 may be secured to the mating pin 200 by other processes in alternative embodiments, such as friction stir welding, riveting, a bolted joint, and the like. In other various embodiments, the cable connector 202 is integral with the mating pin 200, such as formed with the mating pin 200. In various embodiments, the cable connector 202 is configured to be terminated to the power cable 118 by crimping to the power cable 118. In other various embodiments, the cable connector 202 is terminated to the power cable 118 by other processes, such as being welded to a weld tab at the rear end of the power terminal 114.

The mating pin 200 is electrically conductive. For example, the mating pin 200 may be manufactured from a metal material, such as a copper material. In an exemplary embodiment, the mating pin 200 is screw machined. The mating pin 200 may be manufactured from a metal alloy (for example, copper alloy) having additives to increase machinability. In an exemplary embodiment, the mating pin 200 is cylindrical. In an exemplary embodiment, the mating pin 200 includes a cap 216 at a tip 218 of the mating pin 200. The cap 216 is manufactured from a dielectric material, such as a plastic material. The cap 216 makes the power terminal 114 touch-safe at the front of the housing 110.

The mating pin 200 includes a mounting head 220 for mounting the mating pin 200 in the housing 110. In the illustrated embodiment, the mounting head 220 has a larger diameter than the mating pin 200. In an exemplary embodiment, the mounting head 220 includes a latching groove 222 formed circumferentially around the mounting head 220, such as near a forward end of the mounting head 220. In an exemplary embodiment, the mounting head 220 includes a seal groove 226 that receives a seal 228. The seal 228 may be located near a rear end of the mounting head 220.

The cable connector 202 is rearward of the mounting head 220. In an exemplary embodiment, the cable connector 202 includes a crimp barrel 232 at a cable terminating end 240 of the power terminal 114 configured to receive the power cable 118. The cable connector 202 may include a weld tab in alternative embodiments. The cable connector 202 includes an outer surface 234. The temperature sensor assembly 130 (shown in FIG. 3) may be thermally coupled to the outer surface 234, such as proximate to the cable terminating end 240 at the rear 212 of the power terminal 114.

Figure 3:
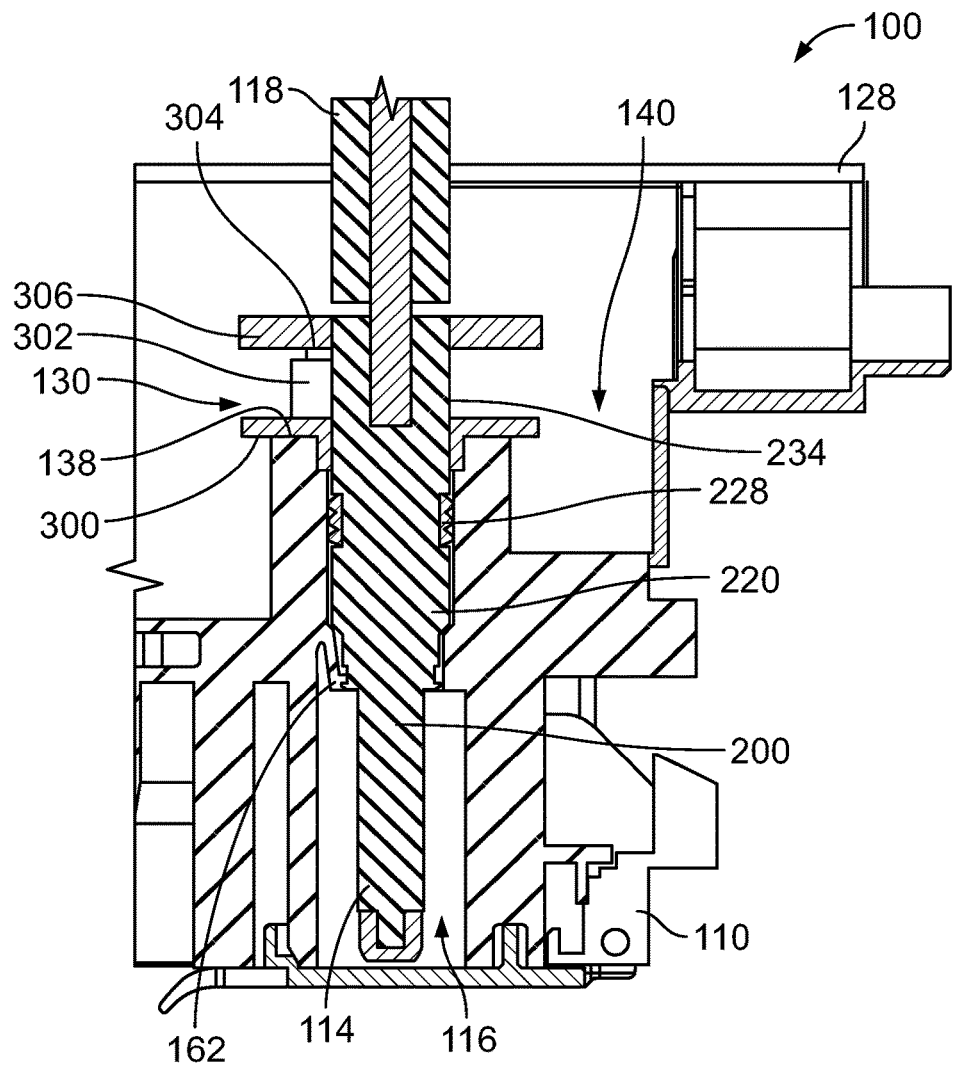
FIG. 3 is a cross-sectional view of the charging inlet assembly in accordance with an exemplary embodiment.

FIG. 3 is a cross-sectional view of the charging inlet assembly 100 in accordance with an exemplary embodiment. FIG. 3 illustrates one of the power terminals 114 coupled to the housing 110. The housing 110 extends to a rear 138 and the rear cover 128 is coupled to the housing 110 at the rear 138. The housing 110 has a chamber 140 at the rear 138. The rear cover 128 is rearward of and closes the chamber 140. The rear cover 128 may include cable exits (for example, openings) that receive the power cables 118 and allow the power cables 118 to exit the chamber 140.

The power terminal 114 is received in the corresponding terminal channel 116. The mating pin 200 is located in the terminal channel 116 for interfacing with a charging connector plugged into the housing 110. The housing 110 includes a primary latch 162 extending into the terminal channel 116 to engage and axially retain the power terminal 114 in the terminal channel 116. The primary latch 162 may be a deflectable latch. The primary latch 162 may be integral with the housing 110, such as being co-molded with the housing 110. The primary latch 162 resists rearward pull out of the power terminal 114 from the terminal channel 116. The mounting head 220 passes through the terminal channel 116 and engages the housing 110 by an interference fit to tightly hold the power terminal 114 in the terminal channel 116. In an exemplary embodiment, the seal 228 is sealed to a surface of the housing 110 defining the terminal channel 116. The power terminal 114 extends into the chamber 140 and the power cable 118 is terminated to the power terminal 114 in the chamber 140. The temperature sensor assembly 130 interfaces with the power terminal 114 in the chamber 140. In an exemplary embodiment, the temperature sensor assembly 130 may be directly thermally coupled to the outer surface 234 to transfer heat directly from the power terminal 114 into the temperature sensor assembly 130.

The temperature sensor assembly 130 includes a sealing pad 300 holding the power terminal 114, a thermal shunt 302 held by the sealing pad 300, a temperature sensor 304 coupled to the thermal shunt 302, and a printed circuit board 306 coupled to the temperature sensor 304. In an exemplary embodiment, the sealing pad 300 is an elastomer pad, such as a silicone rubber pad. The sealing pad 300 is configured to be mounted to the housing 110. Optionally, the sealing pad 300 may be sealed to the housing 110. In an exemplary embodiment, the sealing pad 300 is sealed to the power terminal 114. The sealing pad 300 is electrically insulative to electrically isolate the temperature sensor assembly 130 from the power terminal 114. In an exemplary embodiment, the sealing pad 300 forms part of a thermal path between the power terminal 114 and the temperature sensor 304. The sealing pad 300 is thermally coupled to the power terminal 114, such as by direct engagement between the sealing pad 300 and the power terminal 114.

In an exemplary embodiment, the thermal shunt 302 is separate and discrete from the sealing pad 300. The thermal shunt 302 is manufactured from a material having a higher thermal conductivity than the material of the sealing pad 300. In an exemplary embodiment, the thermal shunt 302 is manufactured from a material having a higher diffusivity than a material of the sealing pad 300. As such, the thermal shunt 302 has quicker response to temperature change as compared to a temperature sensor assembly without a thermal shunt that only utilizes a sealing pad in the temperature sensing path. The temperature sensor assembly 130 thus has less tracking error in temperature sensing for an improved transient response to temperature changes. The thermal shunt 302 enhances thermal transfer between the power terminal 114 and the temperature sensor 304 to lower the thermal resistance along the thermal path between the power terminal 114 and the temperature sensor 304. The high thermal conductivity of the thermal shunt 302 and the higher thermal diffusivity reduces the temperature response time of the temperature sensor assembly 130. In an exemplary embodiment, the temperature sensor 304 is a resistance temperature device; however, other types of temperature sensors may be used in alternative embodiments.

Figure 4:
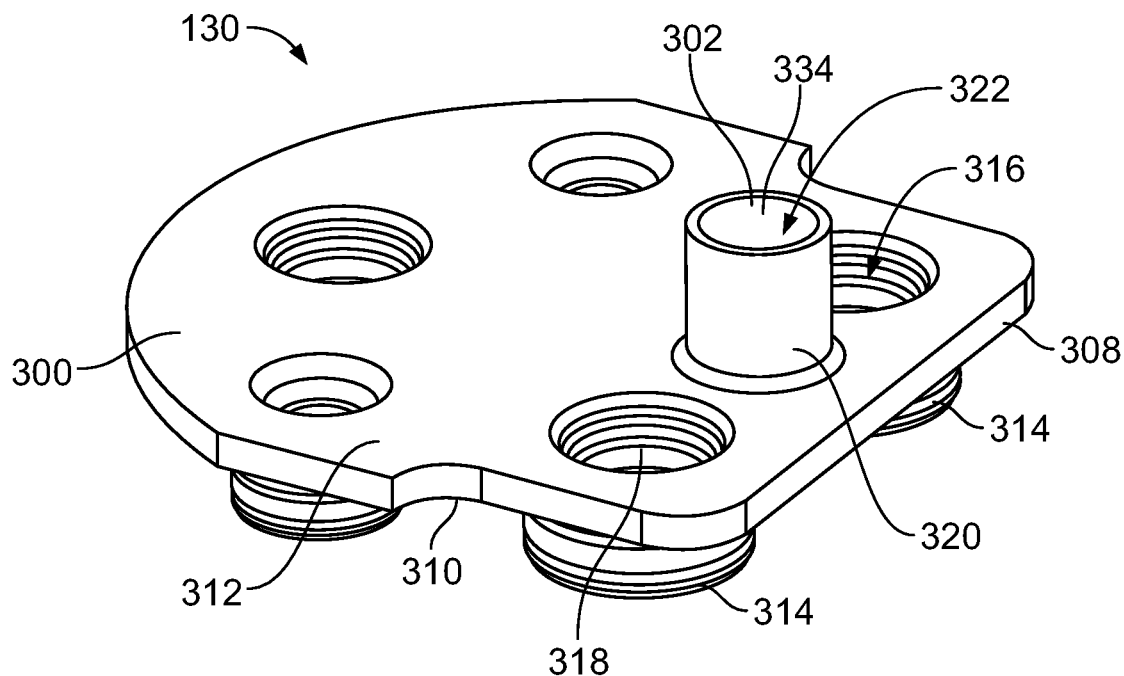
FIG. 4 is a perspective view of a portion of a temperature sensor assembly in accordance with an exemplary embodiment showing a sealing pad and a thermal shunt.
Figure 5:
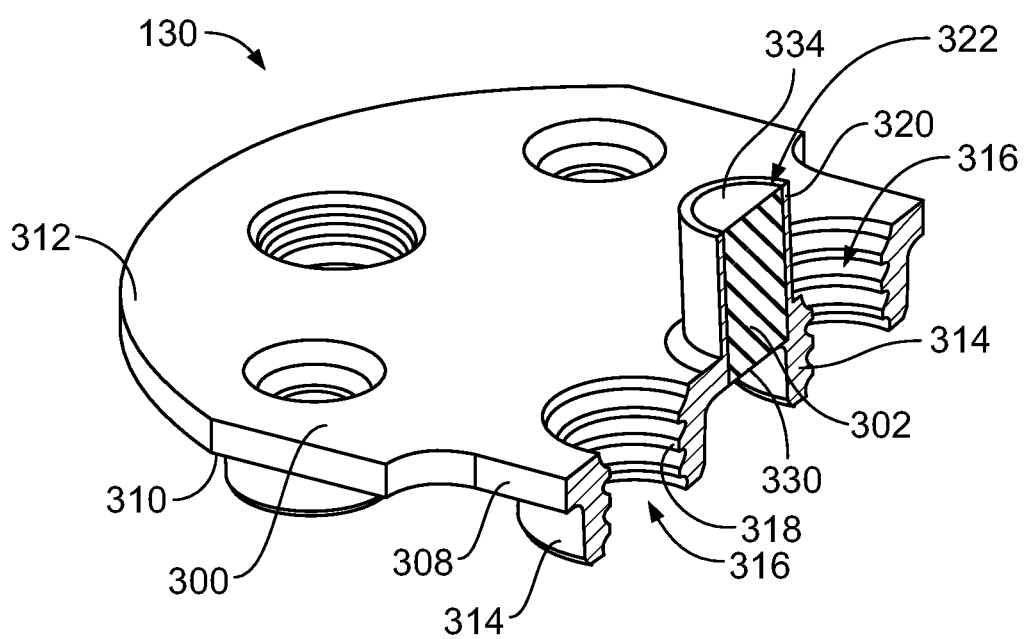
FIG. 5 is a perspective, partial sectional view of the sealing pad and the thermal shunt in accordance with an exemplary embodiment.

FIG. 4 is a perspective view of a portion of the temperature sensor assembly 130 in accordance with an exemplary embodiment showing the sealing pad 300 and the thermal shunt 302. FIG. 5 is a perspective, partial sectional view of the sealing pad 300 and the thermal shunt 302 in accordance with an exemplary embodiment.

The sealing pad 300 includes a pad body 308 extending between a front 310 and a rear 312. The sealing pad 300 includes terminal bushings 314 at the front 310 having terminal openings 316 that receive corresponding power terminals 114 (shown in FIG. 3). The number of terminal openings 316 may correspond to the number of power terminals 114 provided. In an exemplary embodiment, the terminal bushings 314 include ribs 318 along the interior surface defining the terminal opening 316. The ribs 318 are compressible. The ribs 318 within the terminal opening 316 are configured be sealed to the power terminal 114. Optionally, the terminal bushings 314 may include ribs on the exterior surface of the terminal bushings 314 configured to be sealed to the housing 110 (shown in FIG. 3). In an exemplary embodiment, the terminal bushings 314 and/or the pad body 308 directly engage the power terminals 114 to thermally couple the sealing pad 300 with the power terminals 114. In other various embodiments, a thermal interface material may be provided between the power terminals 114 and the terminal bushings 314 and/or the pad body 308.

In an exemplary embodiment, the sealing pad 300 includes a shunt bushing 320 that receives the thermal shunt 302. For example, the shunt bushing 320 includes a shunt opening 322 that receives the thermal shunt 302. The shunt bushing 320 extends from the rear 312. The shunt bushing 320 may additionally or alternatively extend from the front 310. In an exemplary embodiment, the shunt bushing 320 extends to a distal end 332 of the thermal shunt 302. The shunt bushing 320 may cover a portion of the distal end 332 of the thermal shunt 302 in various embodiments. In other embodiments, the distal end 332 of the thermal shunt 302 is uncovered and or may extend beyond the shunt bushing 320. The thermal shunt 302 is separate and discrete from the sealing pad 300. The thermal shunt 302 may be pressed into the shunt bushing 320. In other various embodiments, the sealing pad 300 may be formed in place around the thermal shunt 302.

The thermal shunt 302 extends between a base end 330 and the distal end 332. The base end 330 is coupled to the sealing pad 300, such as the pad body 308 of the sealing pad 300. The distal end 332 is located remote from the base end 330. The distal end 332 is configured to be coupled to the temperature sensor 304. In various embodiments, the temperature sensor 304 may directly engage the distal end 332 of the thermal shunt 302. In alternative embodiments, a thermal interface material may be provided between the temperature sensor 304 and the distal end 332.

The thermal shunt 302 is manufactured from a material having a high thermal conductivity and a high thermal diffusivity. The thermal shunt 302 is arranged in the heat flow path between the power terminal 114 and the temperature sensor 304. In an exemplary embodiment, the thermal shunt 302 is a cylinder. However, the thermal shunt 302 may have other shapes in alternative embodiments. For example, the thermal shunt 302 may be rectangular, triangular, oval, D shaped, or have other shapes or features such as angular features to increase the surface area of the thermal shunt 302. The cross-sectional area and/or the cross-sectional shape of the thermal shunt 302 may vary along the height of the thermal shunt 302. The shape of the thermal shunt 302 may provide keying of the thermal shunt 302 within the sealing pad 300 and/or clocking of the thermal shunt 302 at a particular rotational orientation within the sealing pad 300.

In an exemplary embodiment, the thermal shunt 302 is manufactured from a material having higher thermal conductivity and a higher thermal diffusivity than the material of the sealing pad 300. In various embodiments, the material of the thermal shunt 302 may have lower thermal resistance than the material of the sealing pad 300. For example, the thermal shunt 302 may be manufactured from alumina having a thermal conductivity of approximately 140-170 W/m'K and the sealing pad 300 may be manufactured from silicone rubber having a thermal conductivity of approximately 0.7 W/m'K. The higher thermal conductivity of the thermal shunt 302 yields a lower overall thermal resistance along the heat transfer path, which leads to a lower temperature measurement air by the temperature sensor 304. For example, the addition of the thermal shunt 302 compared to a temperature sensor assembly that only uses the sealing pad 300 without the thermal shunt 302 lowers the thermal resistance from approximately 78K/W to 2.2 K/W.

In an exemplary embodiment, the thermal shunt 302 is manufactured from an aluminum oxide material having a thermal diffusivity of approximately 12.0 mm$^2$/s and the sealing pad 300 is manufactured from silicone rubber having a thermal diffusivity of approximately 0.1 mm$^2$/s. The thermal shunt 302 and/or the sealing pad 300 may be manufactured from other material in alternative embodiments.

In an exemplary embodiment, the thermal shunt 302 is manufactured from a material that is electrically insulative to maintain electrical isolation between the power terminals 114 and the temperature sensor 304. The thermal shunt 302 may be manufactured from other highly thermally conductive materials other than alumina, such as aluminum nitride, mullite, a thermally conductive plastic, and the like. In other various embodiments, the thermal shunt 302 may be manufactured from a metal material, such as aluminum or copper or a ceramic material.

In an exemplary embodiment, the thermal shunt 302 is placed in proximity to the terminal opening 316 and thus in proximity to the power terminal 114. As such, the thermal path through the lower thermally conductive material of the sealing pad 300 is decreased (for example, effectively minimalized) and the thermal path through the higher thermally conductive material of the thermal shunt 302 is increased (for example, effectively maximized). In an exemplary embodiment, a majority of the thermal path between the power terminal 114 and the temperature sensor 304 is through the thermal shunt 302 as opposed to the sealing pad 300. The thermal path through the thermal shunt 302 has a length, such as between a top and a bottom of the thermal shunt 302. The sealing pad 300 has a thermal path having a length between the power terminal 114 and the thermal shunt 302. In various embodiments, the thermal path length of the thermal shunt 302 may be approximately 10 times the thermal path length of the sealing pad 300 (at the closest area between the thermal shunt 302 and the power terminal 114). In an exemplary embodiment, the thermal shunt 302 is used as a thermal path for multiple power terminals 114, such as a pair of power terminals 114. The thermal shunt 302 may be approximately centered between the power terminals 114 to provide thermal paths for both power terminals 114. The temperature sensor 304 is configured to be thermally coupled to the thermal shunt 302 to sense the temperature of both power terminals 114. However, in alternative embodiments, separate thermal shunts 302 and corresponding temperature sensors 304 may be provided for each power terminal 114.

Figure 6:
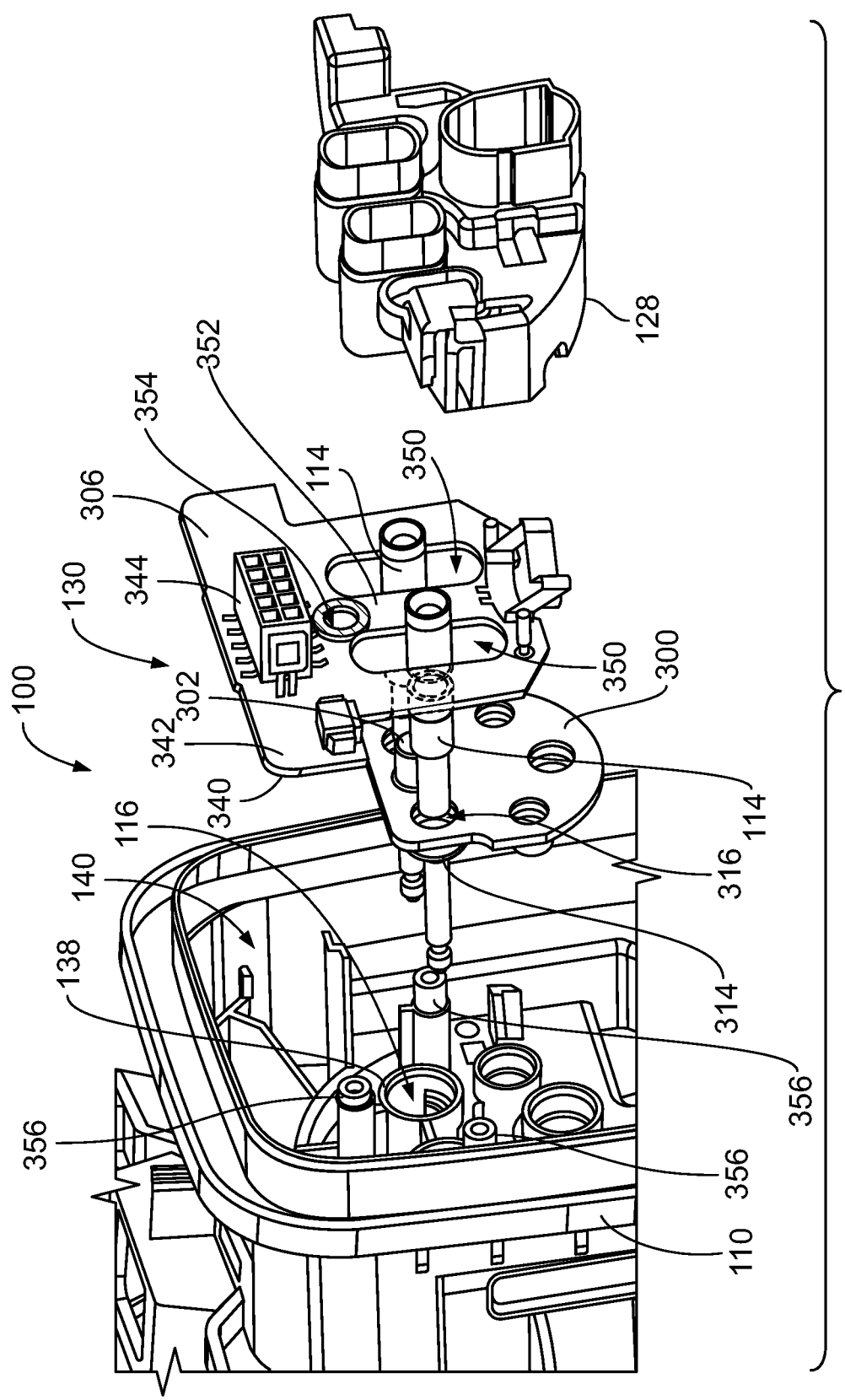
FIG. 6 is a rear perspective view of a portion of the charging inlet assembly showing the temperature sensor assembly in accordance with an exemplary embodiment.
Figure 7:
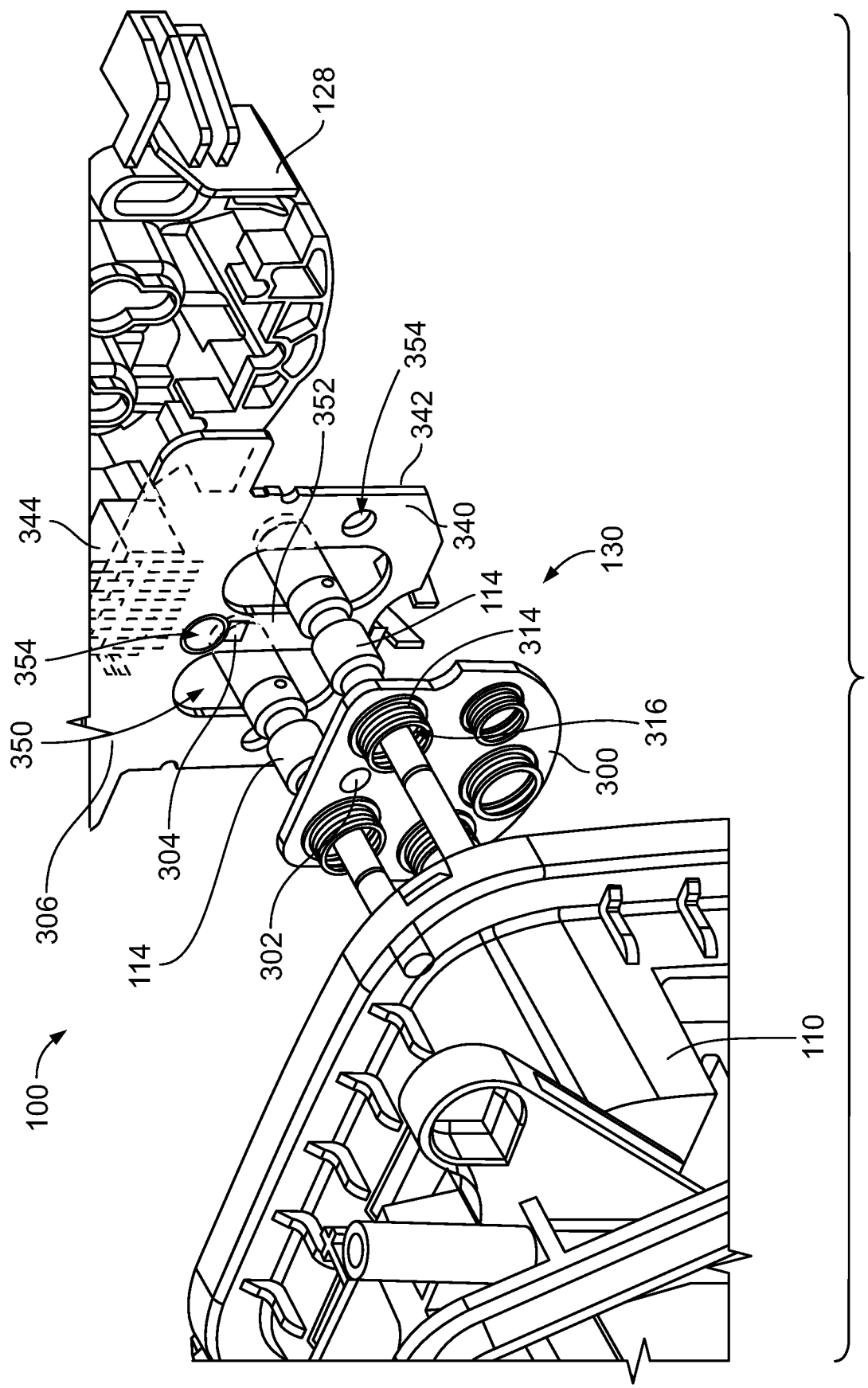
FIG. 7 is a front perspective view of a portion of the charging inlet assembly showing the temperature sensor assembly in accordance with an exemplary embodiment.

FIG. 6 is a rear perspective view of a portion of the charging inlet assembly 100 showing the temperature sensor assembly 130 in accordance with an exemplary embodiment. FIG. 7 is a front perspective view of a portion of the charging inlet assembly 100 showing the temperature sensor assembly 130 in accordance with an exemplary embodiment.

The temperature sensor assembly 130 includes the sealing pad 300, the thermal shunt 302, the printed circuit board 306, and the temperature sensor 304 coupled to the printed circuit board 306. The printed circuit board 306 includes a front 340 and a rear 342. The temperature sensor 304 is mounted to the front 340 of the printed circuit board 306 and is aligned with the thermal shunt 302 such that the temperature sensor 304 is thermally coupled to the thermal shunt 302 when the temperature sensor assembly 130 is assembled within the housing 110.

In an exemplary embodiment, the temperature sensor assembly 130 includes a sensor connector 344 coupled to the rear 342 of the printed circuit board 306. The sensor connector 344 is electrically connected to the temperature sensor 304 by a sensor circuit defined by traces, vias, pads, and the like of the printed circuit board 306. The sensor connector 344 may be soldered or press-fit to the printed circuit board 306. Wires (not shown) may extend from the sensor connector 344, such as to a control circuit for the charging inlet assembly 100.

The printed circuit board 306 includes terminal openings 350 therethrough that receive the power terminals 114.

Optionally, the terminal openings 350 may be oversized to accommodate the power terminals 114. In an exemplary embodiment, the printed circuit board 306 includes a bridge 352 between the terminal openings 350. The bridge 352 supports the temperature sensor 304. The printed circuit board 306 includes mounting openings 354 that receive mounting posts 356 of the housing 110. The mounting posts 356 support the printed circuit board 306 in the chamber 140. Other types of mounting features may be used in alternative embodiments.

During assembly, the power terminals 114 are loaded into the terminal openings 350 in the printed circuit board 306 and in the terminal openings 316 in the sealing pad 300. The power terminals 114 are loaded into the terminal channels 116 in the housing 110. When assembled, the sealing pad 300 may be sealed against the rear 138 of the housing 110. Optionally, the terminal bushings 314 may extend into the terminal channel 116 to seal against the housing 110. The printed circuit board 306 is configured to be mounted to the housing 110 rearward of the sealing pad 300. When assembled, the temperature sensor 304 is coupled to the thermal shunt 302. The rear cover 128 is configured to be mounted to the housing 110 rearward of the temperature sensor assembly 130. The rear cover 128 may be used to secure the printed circuit board 306 within the chamber 140.

During the charging operation, electric current flows through the power terminals 114. The power terminals 114 are heated as the electric current flows through the power terminals 114. The temperature sensor assembly 130 is used to monitor the temperature of the power terminals 114. The temperature sensor 304 of the temperature sensor assembly 130 is in thermal communication with the power terminals 114 through a thermal path defined by the thermal shunt 302 and the sealing pad 300. The higher thermal conductivity and higher thermal diffusivity of the thermal shunt 302 provides an effective and efficient thermal path between the temperature sensor 304 and the power terminals 114. The sealing pad 300 provides electrical isolation between the power terminals 114 and between the temperature sensor 304 and the power terminals 114.

Figure 8:
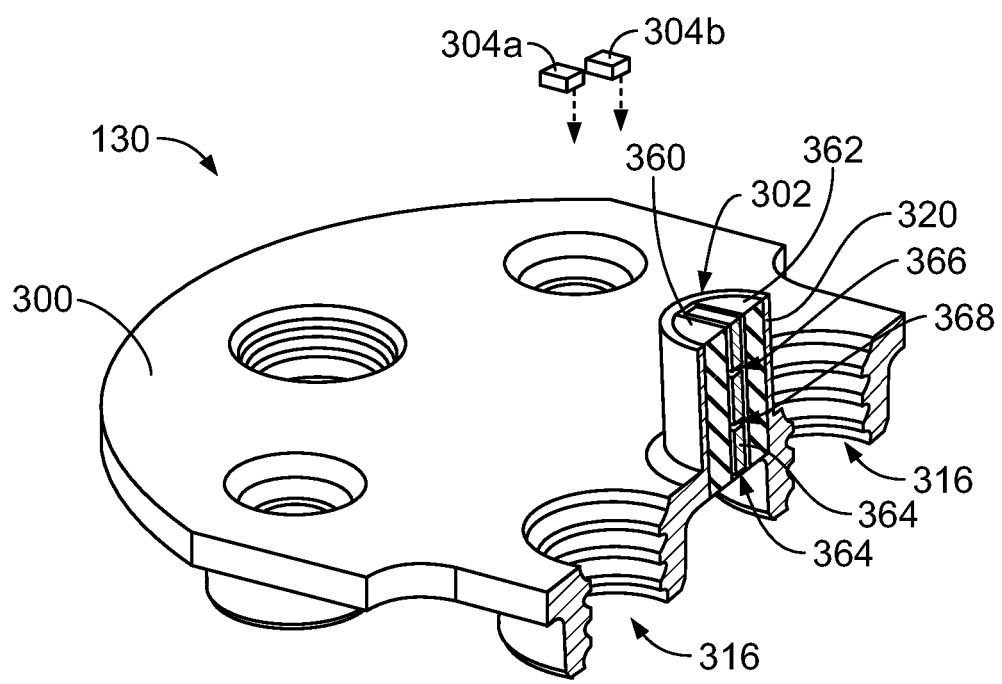
FIG. 8 is a perspective, partial sectional view of a portion of the temperature sensor assembly in accordance with an exemplary embodiment.

FIG. 8 is a perspective, partial sectional view of a portion of the temperature sensor assembly 130 in accordance with an exemplary embodiment. In the illustrated embodiment, the thermal shunt 302 is a multi-piece thermal shunt (for example, a split pin). The thermal shunt 302 includes a first thermal shunt member 360 and a second thermal shunt member 362. The first thermal shunt member 360 is positioned proximate to the first terminal opening 316 that receives the first power terminal 114 and the second thermal shunt member 362 is positioned proximate to the second terminal opening 316 that receives the second power terminal 114. The first thermal shunt member 360 defines a thermal path between the first power terminal 114 and a first power sensor 304a. The second thermal shunt member 362 defines a thermal path between the second power terminal 114 and a second power sensor 304b. As such, the temperature sensor assembly 130 is able to separately and independently monitor the temperatures of the first and second power terminals 114.

In an exemplary embodiment, the first and second thermal shunt members 360, 362 are both received in the shunt bushing 320. In alternative embodiments, the sealing pad 300 includes separate shunt bushings 320 that receive the corresponding thermal shunt members 360, 362. In an exemplary embodiment, the first thermal shunt member 360 is separated from the second thermal shunt member 362 by a thermal separator 364. As such, thermal transfer between the thermal shunt members 360, 362 is reduced or minimized. The thermal separator 364 may be a tape (for example, polyimide tape) or pad positioned between the thermal shunt members 360, 362 and loaded into the shunt bushing 320 with the thermal shunt 302. The thermal separator 364 may be used to mechanically secure the thermal shunt members 360, 362 together. In other various embodiments, the thermal separator 364 may be integral with the sealing pad 300 and the shunt bushing 320, such as being co-molded with the sealing pad 300 and the shunt bushing 320. In various embodiments, the thermal separator 364 may include thermal breaks 366, such as cuts or windows formed in the thermal separator 364. Optionally, the thermal breaks 366 may include air gaps 368 that introduce air between the thermal shunt members 360, 362.

Figure 9:
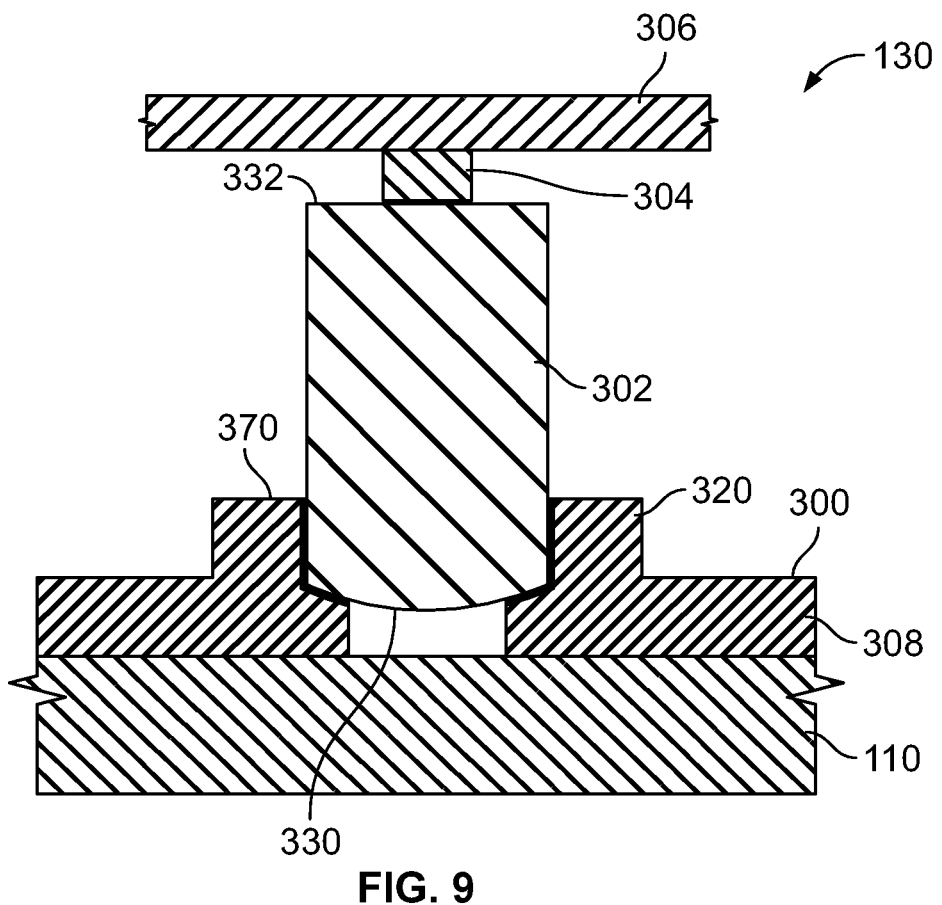
FIG. 9 is a cross-sectional view of a portion of the temperature sensor assembly in accordance with an exemplary embodiment showing the sealing pad, the thermal shunt, the temperature sensor and the printed circuit board.

FIG. 9 is a cross-sectional view of a portion of the temperature sensor assembly 130 in accordance with an exemplary embodiment showing the sealing pad 300, the thermal shunt 302, the temperature sensor 304 and the printed circuit board 306. The temperature sensor assembly 130 is mounted to the housing 110. In the illustrated embodiment, the shunt bushing 320 is relatively short compared to the shunt bushing illustrated in FIG. 8. The shunt bushing 320 extends a short distance along the thermal shunt 302 between the base end 330 and the distal end 332. The thermal shunt 302 extends rearward of the distal end of the shunt bushing 320. The outer surface of the thermal shunt 302 is uncovered and exposed to air rather than being entirely encased in the shunt bushing 320 of the sealing pad 300.

In an exemplary embodiment, a thermal interface material 370 is provided at the interface between the thermal shunt 302 and the sealing pad 300. For example, the thermal interface material 370 is provided along the shunt bushing 320 and along the pad body 308 that receives the base end 330 of the thermal shunt 302 area the thermal interface material 370 may be a thermal grease, a thermal paste, a phase change wax, a thermal tape, or other type of thermal gap filler.

In an exemplary embodiment, the thermal shunt 302 is squeezed into the opening in the sealing pad 300 to provide an efficient mechanical and thermal interface between the thermal shunt 302 and the sealing pad 300. For example, the sealing pad 300 may be compressible against the thermal shunt 302 when the thermal shunt 302 is squeezed into the thermal shunt opening in the sealing pad 300. The shunt bushing 320 exerts a compliant radial normal force on the thermal shunt 302 to retain the thermal shunt 302 in the sealing pad 300. Optionally, the base end 330 of the thermal shunt 302 may be tapered or chamfered to guide loading of the thermal shunt 302 into the opening in the sealing pad 300. The sealing pad 300 may have a complementary shape for efficient thermal transfer along the surface area of the thermal shunt 302. For example, the sealing pad 300 may include a tapered seat that receives the tapered base end 330 of the thermal shunt 302. In an exemplary embodiment, the sealing pad 300 may exert a force on the thermal shunt 302 to press the thermal shunt 302 outward against the temperature sensor 304.

Figure 10:
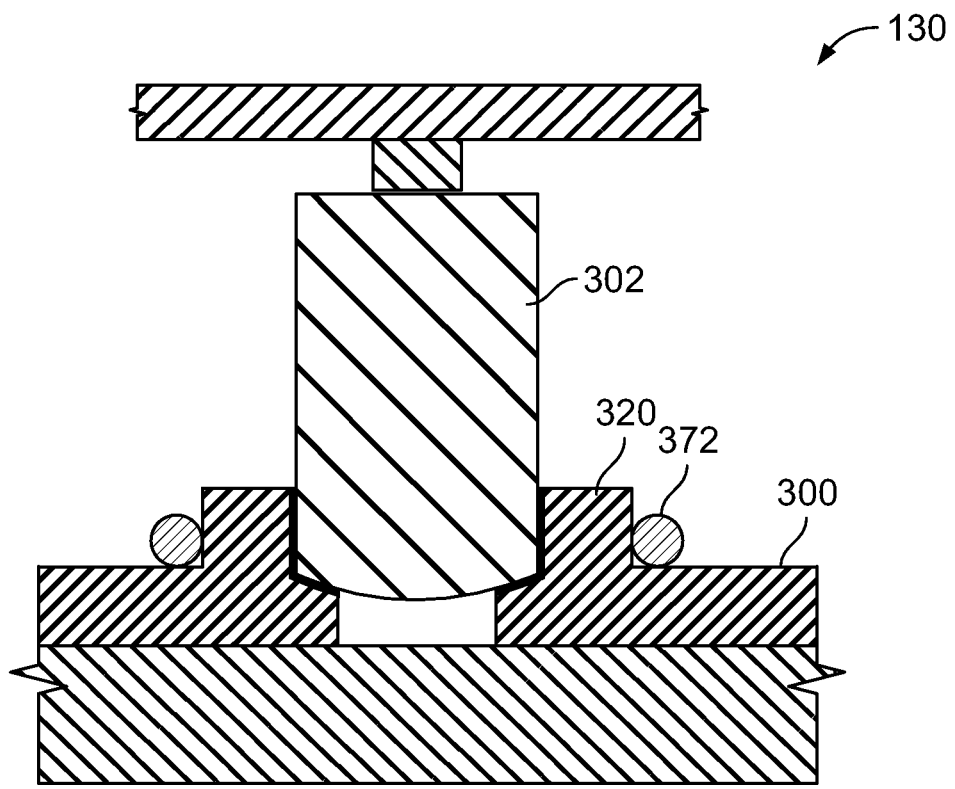
FIG. 10 is a cross-sectional view of a portion of the temperature sensor assembly in accordance with an exemplary embodiment.

FIG. 10 is a cross-sectional view of a portion of the temperature sensor assembly 130 in accordance with an exemplary embodiment. In an exemplary embodiment, the temperature sensor assembly 130 includes a compression member 372 used to compress the sealing pad 300 against the thermal shunt 302. The compression member 372 engages the sealing pad 300 to press the sealing pad 300 inward against the thermal shunt 302. In the illustrated embodiment, the compression member 372 is a compression ring surrounding the shunt bushing 320 that presses the shunt bushing 320 inward against the thermal shunt 302. Other types of compression members may be used in alternative embodiments.

Figure 11:
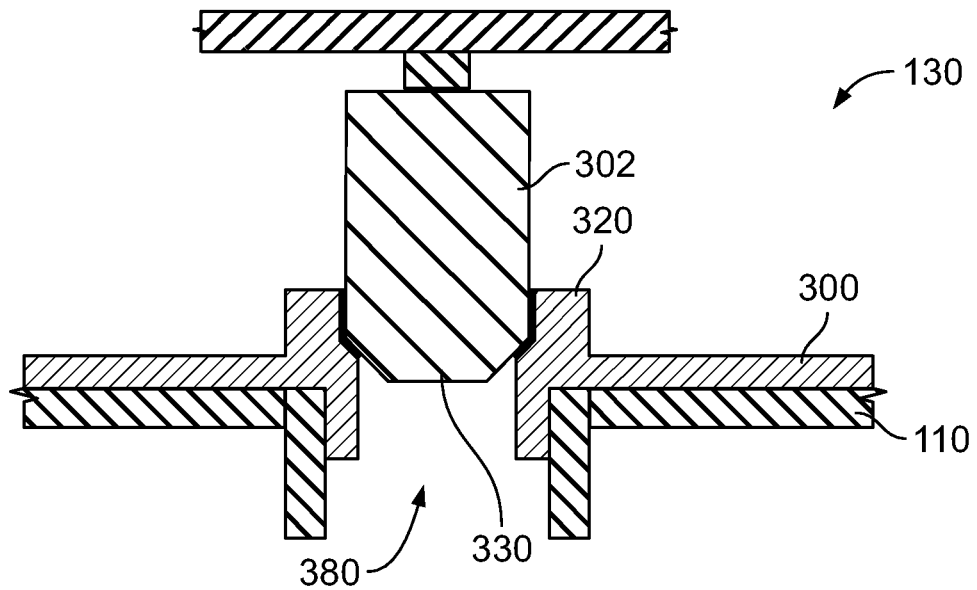
FIG. 11 is a cross-sectional view of a portion of the temperature sensor assembly in accordance with an exemplary embodiment showing the temperature sensor assembly mounted to the housing.

FIG. 11 is a cross-sectional view of a portion of the temperature sensor assembly 130 in accordance with an exemplary embodiment showing the temperature sensor assembly 130 mounted to the housing 110. In an exemplary embodiment, the housing 110 includes a well 380. The shunt bushing 320 of the sealing pad 300 extends into the well 380. The walls defining the well 380 compress the shunt bushing 320 and presses the shunt bushing 320 against the thermal shunt 302. Optionally, the base end 330 of the thermal shunt 302 may extend into the well 380 to compress the shunt bushing 320 between the thermal shunt 302 and the walls defining the well 380.

Figure 12:
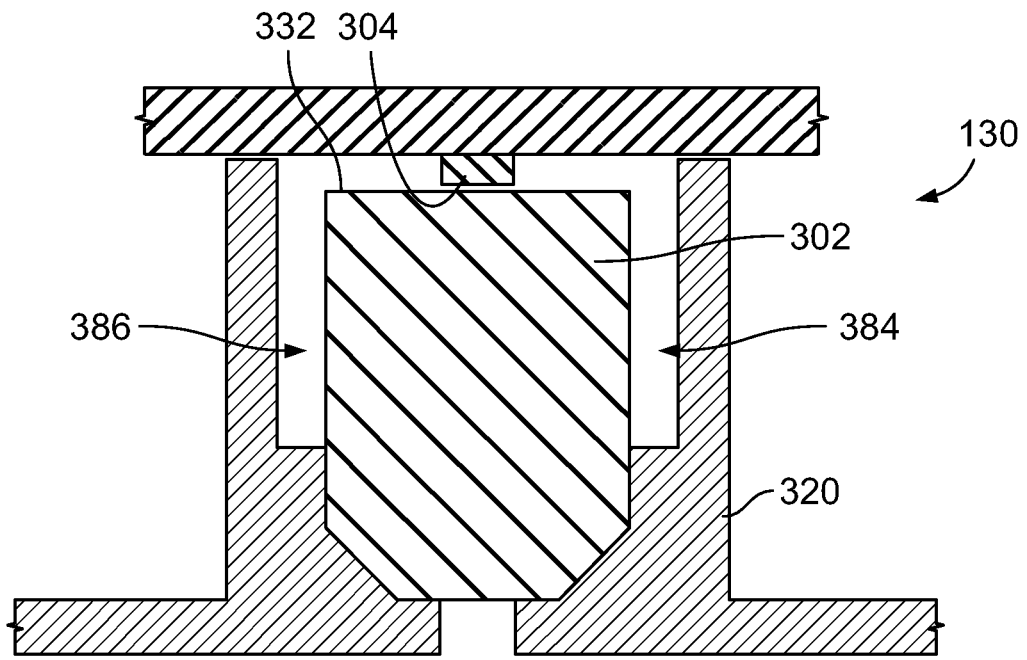
FIG. 12 is a cross-sectional view of a portion of the temperature sensor assembly in accordance with an exemplary embodiment.

FIG. 12 is a cross-sectional view of a portion of the temperature sensor assembly 130 in accordance with an exemplary embodiment. In an exemplary embodiment, the shunt bushing 320 includes a pocket 384 forming an air gap 386 between the shunt bushing 320 and the thermal shunt 302. The air pocket reduces heat loss of the thermal shunt 302 between the base end 330 and the distal end 332 providing a more accurate temperature reading by the temperature sensor 304 and reducing response time air by the temperature sensor 304.

Figure 13:
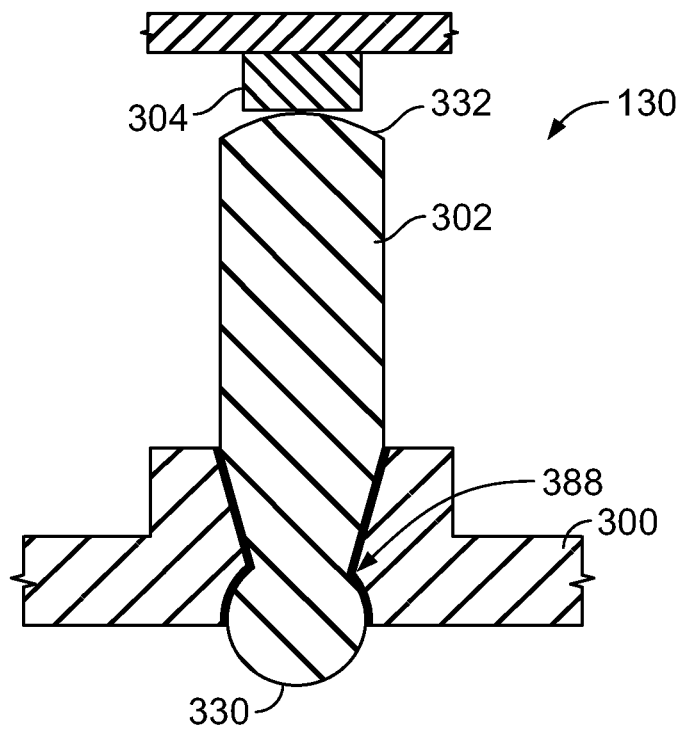
FIG. 13 is a cross-sectional view of a portion of the temperature sensor assembly in accordance with an exemplary embodiment.

FIG. 13 is a cross-sectional view of a portion of the temperature sensor assembly 130 in accordance with an exemplary embodiment. In an exemplary embodiment, the base end 330 of the thermal shunt 302 includes a retention feature 388 used to retain the thermal shunt 302 in the thermal shunt opening of the sealing pad 300. The retention feature 388 may be snapped into the thermal shunt opening in the sealing pad 300 during assembly. In an exemplary embodiment, the retention feature 388 is defined by an undercut forming a groove around the base end 330. The retention feature 388 may engage the sealing pad 300 to resist forward and rearward movement of the thermal shunt 302 relative to the sealing pad 300. The thermal shunt opening in the sealing pad 300 may have a complementary shape as the base end 330 and retention feature 388. The sealing pad 300 may be conformable around the base end 330 and the retention feature 388 to take the shape of the base end 330 and the retention feature 388.

In the illustrated embodiment, the distal end 332 of the thermal shunt 302 is crowned to interface with the temperature sensor 304. The distal end 332 has a convex shape. Optionally, the thermal shunt 302 may be tallest at a center of the distal end 332 to interface with the middle of the temperature sensor 304. The distal end 332 may have other shapes in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:
a housing extending between a front and a rear, the housing having a chamber at the rear, the housing having a terminal channel between the front and the rear;
a power terminal coupled to the housing, the power terminal including a mating pin at a front of the power terminal and a cable connector at a rear of the power terminal, the mating pin positioned in the terminal channel for mating with a charging connector, the cable connector positioned in the chamber at the rear of the housing; and
a temperature sensor assembly positioned in the chamber, the temperature sensor assembly including a sealing pad holding the power terminal, the sealing pad having a front and a rear, the temperature sensor assembly including a thermal shunt held by the sealing pad, the temperature sensor assembly including a temperature sensor coupled to the thermal shunt, the thermal shunt extending from the rear of the sealing pad to the temperature sensor, the sealing pad having a terminal opening receiving the power terminal, the sealing pad being electrically insulative, the sealing pad being thermally coupled to the power terminal and thermally coupled to the thermal shunt, the sealing pad having a first thermal conductivity, the thermal shunt having a second thermal conductivity higher than the first thermal conductivity, wherein the temperature sensor monitors the temperature of the power terminal through a thermal path defined by the sealing pad and the thermal shunt.

2. The electrical connector of claim 1, wherein the thermal shunt is separate and discrete from the sealing pad, the thermal shunt extending into the sealing pad to thermally communicate with the sealing pad.

3. The electrical connector of claim 1, wherein the sealing pad is an elastomer bridging between the power terminal in the terminal opening and the thermal shunt to electrically isolate the thermal shunt from the power terminal.

4. The electrical connector of claim 1, wherein the sealing pad has a first thermal diffusivity, the thermal shunt having a second thermal diffusivity higher than the first thermal diffusivity.

5. The electrical connector of claim 1, wherein the sealing pad includes a bushing extending from the rear, the thermal shunt extending through the bushing to thermally couple with the temperature sensor.

6. The electrical connector of claim 1, wherein the housing includes a well, the sealing pad including a bushing extending into the well, the thermal shunt being received in the bushing, the bushing being compressed between the thermal shunt and the well of the housing.

7. The electrical connector of claim 1, wherein the sealing pad includes a bushing receiving the thermal shunt, the bushing having a pocket including an air gap between the sealing pad and the thermal shunt.

8. The electrical connector of claim 1, wherein the thermal shunt includes a distal end, the distal end being crowned, the temperature sensor interfacing with the crowned distal end.

9. The electrical connector of claim 1, wherein the temperature sensor assembly includes a printed circuit board, the temperature sensor being mounted to the printed circuit board, the temperature sensor assembly including a connector mounted to the printed circuit board and electrically connected to the temperature sensor by a sensor circuit of the printed circuit board.

10. The electrical connector of claim 1, wherein the thermal shunt includes a base coupled to the sealing pad, the sealing pad including a thermal shunt opening receiving the thermal shunt, the base including a retention feature engaging the sealing pad at the thermal shunt opening.

11. The electrical connector of claim 1, wherein the second thermal conductivity is at least 10 times the first thermal conductivity.

12. The electrical connector of claim 1, wherein the power terminal is a first power terminal, the electrical connector further comprising a second power terminal, the thermal shunt being positioned between the first power terminal and the second power terminal to monitor the temperature of both the first power terminal and the second power terminal.

13. The electrical connector of claim 12, wherein the shunt terminal comprises a first shunt terminal member and a second shunt terminal member, the first shunt terminal member positioned proximate to the first power terminal, the second shunt terminal member being positioned proximate to the second power terminal, the temperature sensor comprising a first temperature sensor coupled to the first shunt terminal member to monitor the temperature of the first power terminal, the temperature sensor assembly further comprising a second temperature sensor coupled to the second shunt terminal member to monitor the temperature of the second power terminal.

14. The electrical connector of claim 13, further comprising a thermal separator between the first shunt terminal member and the second shunt terminal member.

15. A temperature sensor assembly for monitoring a temperature of a power terminal comprising:
a sealing pad having a front and a rear, the sealing pad having a terminal opening therethrough receiving the power terminal such that a mating pin of the power terminal extends forward of the sealing pad for mating with a charging connector and a cable connector of the power terminal extends rearward of the sealing pad for terminal to a power cable, the sealing pad is an elastomer being electrically insulative and thermally conductive having a first thermal conductivity, the sealing pad being thermally coupled to the power terminal;
a thermal shunt separate and discrete from the sealing pad, the thermal shunt being held by the sealing pad and extending rearward from the rear of the sealing pad to a distal end, the thermal shunt being thermally coupled to the sealing pad, the thermal shunt having a second thermal conductivity higher than the first thermal conductivity
a temperature sensor coupled to the distal end of the thermal shunt, wherein the temperature sensor is configured to monitor the temperature of the power terminal through a thermal path defined by the sealing pad and the thermal shunt.

16. The temperature sensor of claim 15, wherein the sealing pad has a first thermal diffusivity, the thermal shunt having a second thermal diffusivity higher than the first thermal diffusivity.

17. The temperature sensor of claim 15, wherein the sealing pad includes a bushing, the thermal shunt being received in the bushing, the bushing being compressed between the thermal shunt and a housing.

18. The temperature sensor of claim 15, wherein the sealing pad includes a bushing receiving the thermal shunt, the bushing having a pocket including an air gap between the sealing pad and the thermal shunt.

19. The temperature sensor of claim 15, wherein the thermal shunt includes a distal end, the distal end being crowned, the temperature sensor interfacing with the crowned distal end.

20. A charging inlet assembly comprising:
a housing extending between a front and a rear, the housing having a mounting flange for mounting the housing to a vehicle, the housing having a charging port configured to receive a charging connector, the housing including a chamber at the rear;
an electrical connector within the charging port of the housing, the electrical connector including terminal channels open at the front to receive the charging connector, the electrical connector including power terminals received in the terminal channels, each power terminal includes a mating pin at a front of the power terminal and a cable connector at a rear of the power terminal, the mating pin positioned in the corresponding terminal channel for mating with the charging connector, the cable connector extending into the chamber for electrical connection to a power cable; and
a temperature sensor assembly positioned in the chamber, the temperature sensor assembly including a sealing pad holding the power terminals, the temperature sensor assembly including a thermal shunt held by the sealing pad, the temperature sensor assembly including a temperature sensor coupled to the thermal shunt, the sealing pad having terminal openings receiving the power terminals, the sealing pad being electrically insulative to electrically isolate the power terminals, the sealing pad being thermally coupled to the power terminals and thermally coupled to the thermal shunt, the sealing pad having a first thermal conductivity, the thermal shunt having a second thermal conductivity higher than the first thermal conductivity, the sealing pad having a first thermal diffusivity, the thermal shunt having a second thermal diffusivity higher than the first thermal diffusivity, the sealing pad electrically isolating the thermal shunt from the power terminals, wherein the temperature sensor engages the thermal shunt to monitor the temperature of the power terminals through the sealing pad and the thermal shunt.

21. The charging inlet assembly of claim 20, wherein the sealing pad includes a front and a rear, the thermal shunt extending from the rear of the sealing pad to the temperature sensor.

* * * * *